United States Patent [19]

Vahlensieck et al.

[11] 4,251,282

[45] Feb. 17, 1981

[54] METHOD OF PREPARING DYE PIGMENTS

[75] Inventors: Hans-Joachim Vahlensieck, Wehr; Peter Fischer; Alfred Blümcke, both of Rheinfelden, all of Fed. Rep. of Germany

[73] Assignee: Dynamit Nobel Aktiengesellschaft, Troisdorf, Fed. Rep. of Germany

[21] Appl. No.: 939,371

[22] Filed: Sep. 5, 1978

[30] Foreign Application Priority Data

Sep. 3, 1977 [DE] Fed. Rep. of Germany ....... 2739845

[51] Int. Cl.³ .......................................... C04B 31/00
[52] U.S. Cl. ................................ 106/289; 106/308 B
[58] Field of Search .............. 106/289, 308 B, 308 Q; 423/338

[56] References Cited

U.S. PATENT DOCUMENTS

| | | | |
|---|---|---|---|
| 666,302 | 1/1901 | Collins | 106/289 |
| 3,477,866 | 11/1969 | Remer | 106/289 |
| 3,689,300 | 9/1972 | Bunger et al. | 106/308 B |
| 3,716,388 | 2/1973 | Lopez et al. | 106/289 |
| 4,132,560 | 1/1979 | Marquisee et al. | 106/308 B |

FOREIGN PATENT DOCUMENTS

| | | | |
|---|---|---|---|
| 2154764 | 5/1972 | Fed. Rep. of Germany | 423/338 |
| 201941 | 4/1924 | United Kingdom | 106/289 |
| 760116 | 10/1936 | United Kingdom | 106/289 |

*Primary Examiner*—O. R. Vertiz
*Assistant Examiner*—Gary P. Straub
*Attorney, Agent, or Firm*—Sprung, Felfe, Horn, Lynch & Kramer

[57] ABSTRACT

A water-insoluble dye pigment especially useful in the coloring of plastic articles and a method of preparing the same by hydrolyzing a water-soluble dye with an organooxysilane and drying the resultant gel.

4 Claims, No Drawings

METHOD OF PREPARING DYE PIGMENTS

BACKGROUND OF THE INVENTION

1. Field of the Invention

This invention relates to novel water-insoluble silica-containing pigments for use in coloring plastic articles. More especially, this invention relates to water-insoluble silica-containing dye pigments made by a process comprising hydrolyzing a water-soluble dye in the presence of an organooxysilane and drying the resultant gel.

2. Discussion of the Prior Art

Only pigments or dyes which are insoluble in water are suitable for coloring plastic articles, since they cannot be dissolved out of the polymer upon treatment with cold or hot water. The coloring of varnishes and lacquers can, for the same reasons, be performed only with water-insoluble dyes or with pigments.

Furthermore, it is often desirable to give plastic moldings or even varnishes and lacquers a dull appearance. For this purpose, chalk is generally added to the raw materials as a dulling agent. Chalk has the disadvantage, however, that it often brings about an undesirable increase in the bulk weight of the polymer, thereby increasing its density.

The problem therefore existed of converting water-soluble dyes to an insoluble form which, if possible, would at the same time also produce a dulling effect.

SUMMARY OF THE INVENTION

In accordance with this invention, problems attendant the prior art are solved by a water-insoluble silica-containing dye derived from a water-soluble dye pigment, said pigment being in the form of a dye-bearing silica gel.

In accordance with the method of this invention, such a water-insoluble dye-bearing silica gel is prepared by a process comprising hydrolyzing a water-soluble dye with an organooxysilane and thereafter drying the resultant gel so formed. If desired, the resultant product can be crushed, pulverized or otherwise sized to a desired particle size.

In accordance with the present invention, organooxysilanes are hydrolyzed in the presence of water-soluble dyes. The term "organooxysilanes" is to be understood to include orthosilicic acid esters and their hydrolyzates, as well as alkyl silanes of the formula $(RO)_{4-n}Si(R'X)_n$ wherein
R represents alkyl moieties of 1 to 4 carbon atoms,
R' represents alkylene moieties of 1 to 6 carbon atoms, and
X represents hydrogen
or

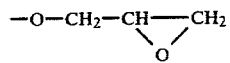

or

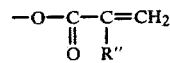

-continued
(R" = H, CH$_3$ or C$_2$H$_5$)

or

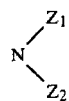

[Z$_1$=H or —(CH$_2$)$_m$—NH$_2$ (m=2-4) and Z$_2$=H or Z$_1$] and n can be equal to 1 or 2.

The hydrolyzates of the silicic acid esters are condensation products obtained by the incomplete hydrolysis of orthosilicic acid esters. They are also known as polysilicic acid esters. The ester components in these compounds can have between 1 and 4 carbon atoms. The hydrolyzates contain as many as 10, but preferably about 3 to 5 Si—O—Si bonds; their SiO$_2$ content is approximately between 35 and 52 percent. At the same time, the SiO$_2$ content of the polysilicic acid methyl esters is about 50 percent and the SiO$_2$ content of the polysilicic acid ethyl esters is between 38 and 42 percent. The usable polysilicic acid propyl or butyl esters have a correspondingly lower SiO$_2$ content.

The hydrolysis of the organooxysilanes is performed in a manner which is known. It is preferable to operate in a weakly alkaline or weakly acid medium, in order to obtain the completest possible reaction. Generally, the pH of the medium is 1 to 14 preferably 4-10. Easily proportioned compounds such as ammonia, hydrochloric acid or oxalic acid are especially suitable as alkalies or acids to adjust the pH. Additional heating of the solution being hydrolyzed is unnecessary. Warming takes place as a result of the exothermy of the hydrolysis reaction. A gel forms in the hydrolysis, which, after water washing if desired, is dried directly and can then be ground.

Hydrolysis of the organooxysilanes is generally performed at a temperature between 20° and 65° C., preferably between 20° and 45° C. While subatmospheric pressures can be employed and super-atmospheric pressures can be utilized, it is decidedly preferred to perform the hydrolysis at atmospheric pressure. Generally, hydrolysis is effected over a period of time of between 1 minute and several hours. The hydrolysis is performed generally so that the number of Si—O—Si bonds ranges up to 10 per molecule of hydrolyzate, preferably 3 to 7, in the case of hydrolyzates of silicic acid esters.

By the method of the present invention, any water-soluble dyes can be insolubilized, so that they can be used as coloring components in plastic articles or in varnishes and lacquers. Especially suitable are organic dyes, such as, for example, direct dyes, vat dyes, leuco vat dyes, reactive dyes, acid dyes, sulfur dyes, dispersion dyes, chrome dyes, basic dyes, union dyes, pigment dyes and naphthol dyes.

The amount of the dyes which are hydrolyzed together with the organooxysilanes depends on the desired color intensity of the pigments. Even with a dye content of only 1 percent, the pigments obtainable according to the invention are intensely colored. However, contents of over 27 percent, for example, can be obtained, which are still so firmly bonded to the silica gel that they cannot be washed out by treatment with water. Generally speaking, the dye to be hydrolyzed with the organooxysilane is between 1 and 30 weight percent of the combined weight of the dye and organooxysilane. The resultant product contains 1 to 30, preferably 5 to 20 weight percent dye and 70 to 99, preferably 80 to 95 weight percent silica in the form of silica gel.

In preparing the composition of this invention, the dyes are best dissolved and this solution is used for hydrolyzing the organooxysilanes. The amount of water used must be at least the stoichiometric amount needed for the complete hydrolysis of the alkoxy groups. It is desirable, however, to use an excess of water is order to assure complete hydrolysis. Generally, the water is present up to a 2–3 stoichiometric excess. The excess, however, should not be too great, since the excess water has to be removed again in the subsequent drying. Drying is performed at 20° to 150° C., preferably 20° to 110° C. at a pressure of 1 Torr to 1 atmospheres preferably 30–1 Torr depending upon the degree of dryness desired. Preferably, the residual water content of the resultant pigment is below 1–5 percent by weight. Drying can be performed using a sweep gas, e.g., air, to assist in removal of water from the pigment.

If the hydrolysis is performed with tetraalkylsilanes, hydrophilic dye pigments are obtained by the method of the invention. If, however, alkyl alkoxysilanes are used as starting products, hydrophobic dye pigments are formed in the hydrolysis. By varying the content of tetraalkylsilanes (or their condensation products) and alkylalkoxysilanes, therefore, dye pigments can be prepared having gradated properties. In this manner one can produce dye pigments which, when incorporated into polymers or varnishes, have optimum hydrophobic properties. The hydrophobic dye pigments are especially suitable for the manufacture of color varnishes and lacquers, since they considerably increase the water repellent properties of the film.

In the dye pigments obtained, the dye is firmly bonded to the silica gel structure. Even intensive treatment with water fails to wash it out.

The pigments obtained are suitable for the tinting of polymers such as, for example, PVC, the silica gel being able to serve simultaneously as a filler instead of the commonly used chalk. This is an additional advantage of the pigments of the invention. They serve simultaneously in many polymers as colorant and filler, and thus eliminate the formerly common, repeated, in some cases separate, weighing out of filler and colorant in the production of colored plastic articles.

Furthermore, the pigments of the invention can, on the basis of their silica gel content, also be used as a dulling agent in place of the formerly common chalk. The dulling effect is especially strong if an alkyl trialkoxysilane such as isobutyltrimethoxysilane, for example, is hydrolyzed as the starting material.

The dye-bearing silica gels of the present composition can be included in a wide variety of thermoplastic and thermosetting polymers including vinyl and vinyl related polymers, especially polyvinyl chloride and polyvinylidene fluoride, the acrylates and the like, polyolefins especially polyethylene, polypropylene, polybutadiene, polybutene-1, including olefin copolymers and terpolymers, polyamides including especially nylon 6 and nylon 6/6, condensation polymers including, in particular, polyesters, especially polyesters derived from terephthalic acid or an ester-forming moiety thereof, and a dihydric alcohol, especially butanediol-1,4, and ethylene glycol, polycarbonates, epoxy resins, melamine formaldehyde resins, fluoroplastics, phenolic resins, polyarylethers, alkyl resins, silicones, etc.

In order to more fully illustrate the nature of the invention and the manner of practicing the same, the following examples are presented:

EXAMPLES

EXAMPLE 1

243 g of tetramethoxysilane is placed in a reaction vessel at 20° C. With stirring, a solution of 576 ml of ammonia solution (1% ammonia) and 4 g of Anthrasol-Brilliant Orange 3 RK is added. The reaction temperature then rises in a few minutes to 42° C., with the precipitation of an orange-colored gel. The gel is washed with water and vacuum dried. 100 g of silica gel having a 4% dye content is obtained.

EXAMPLE 2

102 g of tetramethoxysilane and 53 g of gamma-glycidoxypropyltrimethoxysilane are placed in a reaction vessel at 20° C. With stirring, a solution of 27.3 g of Indanthrene Blue RS in 545 ml of water and 1.4 ml of ammonia solution (concentrated), whereupon the mixture warms to about 34° C. Shortly before reaching the temperature maximum, the mixture gels to a solid mass. It is dried in a rotary evaporator at 26 to 40 mbar and 110° C., and 100 g is obtained of a dark blue silica gel having a dye content of 27.3%. It is not possible to wash the dye out again even by intensive treatment with water.

EXAMPLE 3

In the manner described in Example 1, 152 g of gammaglycidoxypropyltrimethoxysilane, 194 ml of an 0.2% ammonia solution and 3.5 g of Sirius Scarlet Red BN yield a gel which after drying gives 100 g of a dark red pigment containing 3.5% dye.

EXAMPLE 4

In a manner similar to Example 1, 103 g of n-propyltrimethoxysilane, and 100.4 tetramethoxysilane, upon reaction with a solution of 43 ml of methanol, 19.5 ml of hydrochloric acid (1% solution) and 1 g of Remacryl Yellow 4 GL, yield an intensely yellow-colored precipitate, which after drying gives 100 g of yellow silica gel containing 1% dye.

EXAMPLE 5

By the reaction of 103.3 g of tetramethoxysilane and 115.5 g of isobutyltrimethoxysilane with a solution of 44.5 ml of methanol, 19 ml of hydrochloric acid (1% solution) and 1.5 g of ammonium carbaminate solution (2.5% solution), a voluminous precipitate is obtained which, after drying, yields 100 g of green silica gel having a 1.5% dye content.

EXAMPLE 6

From 189 g of a partially condensed tetramethoxysilane having a 50% silicon dioxide content (commercially obtainable under the name Dynasil 51) and a solution of 680 ml of a 1% ammonia solution and 3.5 g of Remazol Red B, a red precipitate is obtained which is dried to yield 100 g of a strongly red colored silica gel having a 3.5% dye content.

EXAMPLE 7

From 130 g of a partially condensed tetramethoxysilane having a 50% silicon dioxide content (commercially obtainable under the name Dynasil 51) and 55 g of gamma-aminopropyltriethoxysilane and a solution of 120 ml of methanol, 50 ml of water, 20 ml of 1% hydrochloric acid solution and 5 g of Palanil Luminous Red G, a dark red precipitate is obtained, which yields upon drying 100 g of silica gel having a 5% dye content.

The dye pigments obtained in Examples 1 to 7 can be ground in a known manner to any desired fineness corresponding to the anticipated application.

What is claimed is:

1. A method of preparing a dye pigment which is water insoluble which comprises hydrolyzing a water soluble dye together with an alkyl alkoxysilane of the formula $$(RO)_{4-n}Si(R'X)_n$$

wherein

R represents an alkyl moiety of 1 to 4 carbon atoms,
R' represents an alkylene moiety of 1 to 6 carbon atoms,
X represents hydrogen or

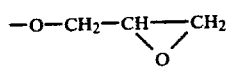

or

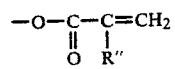

(R" = H, CH$_3$ or C$_2$H$_5$)

or

wherein $Z_1 =$ H or $-(CH_2)_mNH_2$ (m = 2–4),
$Z_2 =$ H or $Z_1$ and
n = 1 or 2.

2. A method of preparing a dye pigment according to claim 1, wherein said alkyl alkoxysilane is in admixture with a tetraalkylsilane.

3. A method according to claim 1 wherein the hydrolysis is performed in an alkaline or acidic medium.

4. A method according to claim 1 wherein said dye is a direct dye, a vat dye, a leuco vat dye, a reactive dye, an acid dye, a sulfur dye, a dispersion dye, a chrome dye, a basic dye, a union dye, a pigment dye or a naphthol dye.

* * * * *